Feb. 28, 1928. 1,660,633
S. TEMBEY
HAND ROPE DEVICE FOR STREET CARS
Filed April 27, 1927
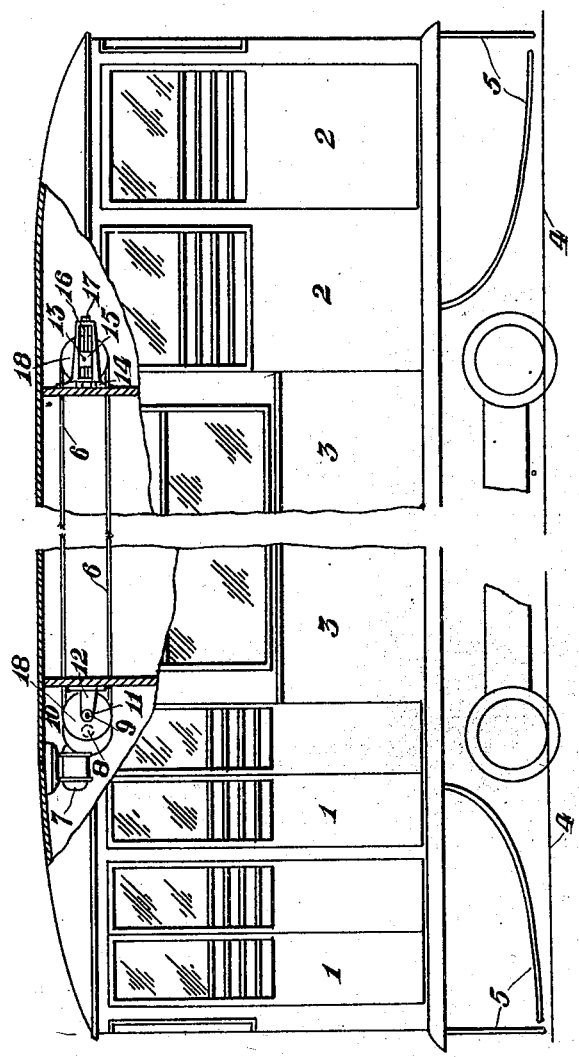
Samuel Tembey
Inventor
T. L. Boyden.
Attorney Patented Feb. 28, 1928.

1,660,633

UNITED STATES PATENT OFFICE.

SAMUEL TEMBEY, OF NANAIMO, BRITISH COLUMBIA, CANADA.

HAND-ROPE DEVICE FOR STREET CARS.

Application filed April 27, 1927, Serial No. 187,060, and in Canada February 2, 1927.

This invention relates to a hand-rope device for electric street cars or like public conveyances. Its main object is to facilitate the service by providing a readily available assistance to passengers passing along the gangway to and from their seats.

The difficulty of expeditiously conducting a passenger to or from the available seat has for long been obvious in all systems of transportation by public conveyance and such traffic is continually retarded in consequence of this. Hitherto stationary hanging straps have been the only attempted solution of the problem.

This invention provides two hand-ropes conveniently within reach of passengers standing in the passage or aisle of a street car, passenger bus or the like. Both ropes are continuously moving lengthwise of the car at a moderate rate of speed, so that when grasped by a passenger, he is supported (as in the case of a hanging strap) and is gently assisted along the passage to the door or to the vacant seat.

In this way a passenger can always secure a comfortable hold on the rope and be piloted to his seat, even when turning sharp corners—a condition which now entirely arrests any purposed movement within a street car and so delays traffic, and an uneven condition of the road bed is almost as bad.

This invention is designed to practically eliminate these conditions and in doing so will greatly expedite the rapidity of service in large cities, and proportionately elsewhere.

The drawing herewith forming part of this application, in conjunction with the detailed specification clearly shows the character and application of the device.

The single figure shown gives the general outline of a street car of the ordinary electrically operated type with a vestibule at each end for the motorman and conductor and the reception and discharge of passengers. The centre of the body portion is broken away and omitted in order to save space and permit a larger view to be shown.

The motorman's vestibule is indicated by 1 and the conductor's vestibule by 2, the intervening body by 3, the rail level by 4, and the outline of the life guards by 5, these numerals being sufficient to designate the general position of the parts for the purpose of understanding the location and function of the details of the device.

The moving hand-ropes 6 are so placed about each side of the car body passage or aisle as to be unobstrusive in a general sense but at the same time to be conveniently within reach of a passenger entering or about to leave the conveyance.

A small electric motor 7 which may be conveniently secured to the roof as shown, or located in other suitable position, drives a double cross shaft 8 and 9 carrying the small spur wheels 10 and 11 so as to reverse the motion on one of the shafts. The shafts may be conveniently supported in brackets as at 12 secured to the vestibule wall or bulkhead.

At the other end of the vehicle are two shafts 13 in alignment carried by brackets 14, the latter having an extension forming a slide which carries the shaft bearing 15 and is adjustable lengthwise by a screw device 16 so that the tension of the moving hand-rope 6 may be suitably adjusted by revolving the screw 16 at the external projection 17 by a hand crank or spanner or the like.

Suitable grooved pulleys 18 running loose on the rear shaft 13 and secured rigidly to the fore shafts 8 and 9 carry and drive the two moving hand-ropes which can be immediately stopped or started by a switch within reach of the motorman. It is, however, intended that the ropes should be constantly kept moving at a moderate convenient rate of speed when the car is in operation.

Having now particularly described my invention, what I claim and desire to be protected by Letters Patent, is:

1. In combination with a passenger transportation car, a travelling hand-rope, said rope being positioned lengthwise of and above the aisle of the said car, means for propelling said rope, said means being positioned in the vestibule of said car, means for adjusting the tension of said rope.

2. In combination with a passenger transportation car, a pair of moving hand-ropes, said ropes being positioned lengthwise of and above the aisle of said car, means for propelling said ropes in opposite directions, means for adjusting the tension of said ropes, both said means being located in a vestibule of said car.

3. In combination with a passenger transportation car, a pair of moving hand-ropes, said ropes being positioned lengthwise of and above the aisle of said car, two shafts, each said shaft secured to a pulley suitable for propelling one of the said ropes, gear wheels secured to said shafts, said wheels meshing together and being adapted to drive the said shafts in opposite directions, a motor located in the vestibule of said car adapted to drive one of the said shafts, a pair of shafts in the vestibule opposite to the said vestibule, pulleys carried by the last said shafts, said pulleys being suitable to receive and guide said ropes, brackets for supporting the said shafts, the two brackets carrying the guide pulley shafts having a projection forming a slide, each said slide carrying a bearing, said bearing carrying the said shaft, a screw adjustment means adapted to adjust the tension of the said travelling ropes.

In testimony whereof I affix my signature.

SAMUEL TEMBEY.